United States Patent [19]

Huignard et al.

[11] Patent Number: 4,586,779
[45] Date of Patent: May 6, 1986

[54] DEVICE FOR MEMORY-STORAGE OF A COHERENT IMAGE IN A MULTITUDE OPTICAL CAVITY

[75] Inventors: Jean-Pierre Huignard; Daniel Rak; Isabelle Ledoux; Jean-Pierre Herriau, all of Paris, France

[73] Assignee: Thomson-CSF, Paris, France

[21] Appl. No.: 497,682

[22] Filed: May 24, 1983

[30] Foreign Application Priority Data

May 28, 1982 [FR] France .................... 82 09448

[51] Int. Cl.⁴ .............. G03H 1/02; G02B 27/46; G11B 7/00
[52] U.S. Cl. .................. 350/364; 350/162.12; 365/216
[58] Field of Search ............. 350/3.64, 162.12; 356/350; 365/216

[56] References Cited

U.S. PATENT DOCUMENTS

| 3,466,110 | 9/1969 | Pole et al. | 356/172 |
| 3,632,182 | 1/1972 | Sincerbox | 356/172 |
| 4,284,324 | 8/1981 | Huignard et al. | 350/3.64 |
| 4,451,151 | 5/1984 | Huignard | 356/350 |

OTHER PUBLICATIONS

Huignard, J. P. et al, "Coherent Signal Beam Amplification in Two-Wave Mixing Experiments with Photorefractive $Bi_{12}SiO_{20}$ Crystals", *Optics Communications*, vol. 38, No. 4, pp. 252-254.

Marrakchi A. et al, "Application of Phase Conjugation in $Bi_{12}SiO_{20}$ Crystals to Mode Pattern Visualisation of Diffuse Vibrating Structures" pp. 15-18 of Optics Communications, vol. 34, No. 1, Jul., 1980.

Sincerbox, G. T. et al, "System to Increase the Efficiency of the Holographic Energy Distribution for Individual Chip Replacement" IBM Tech Disc. Bull. vol. 23, No. 2 Jul. 1980 pp. 831-832.

*Primary Examiner*—Bruce Y. Arnold
*Attorney, Agent, or Firm*—Cushman, Darby and Cushman

[57] ABSTRACT

Device for memory-storage of a coherent image in a multimode optical cavity. A coherent light source generates a signal wave and a reference wave and provides these waves to optical guiding devices. These optical guiding devices form a closed loop in which the signal wave circulates. The guiding devices form a multimode optical cavity having a Fourier plane. An amplifying interactive medium is disposed within the cavity on the path of the signal wave and at the Fourier plane. Within the interactive medium, the signal wave interferes with the reference wave in order to create a diffraction grating. Each signal wave thus receives energy from the reference wave with which it interferes. A semi-transparent beam splitter is disposed within the cavity on the path of the signal wave in order to extract a portion of the energy from the optical cavity.

8 Claims, 7 Drawing Figures

DEVICE FOR MEMORY-STORAGE OF A COHERENT IMAGE IN A MULTITUDE OPTICAL CAVITY

BACKGROUND OF THE INVENTION

The present invention concerns a memory-storage device of a coherent image in a multimode optical cavity.

The memory-storage of optical data assumes various forms and covers numerous fields of application: these include the recording of bidimensional or trimensional objects. Photography is the first form and, furthermore, essential form of optical storage, but lasers have encouraged the development of new processes applicable especially to audiovisual and data-processing fields. However, if research is widespread, present applications are limited. Two applications appear, indeed, to represent the possibilities offered by optical storage: holographic storage and the storage of television images on "video records".

The field of the invention is that of storage and subsequent processing, of coherent images. But contrary to the two applications mentioned above, this invention is directed toward the dynamic recording of coherent images.

Another possibility is envisaged in French Patent application filed Feb. 27, 1981 under No. 81 03989 that describes a device allowing the circulation in an optical guide, of a radiating energy impulse issuing from a coherent source at the propagation. The impulse is regenerated at a constant level. It is also possible, according to the device, to envisage an amplification of an incident energy radiating impulse by transferring the energy of a pumping beam towards the signal. This device thus ensures the circulation of a radiating energy impulse in a fiber while maintaining the level of the signal whatever the number of turns achieved. But in this case, it only involves an impulse, the amplitude of which is conserved while being propagated in a monomode wave guide. This device, indeed, does not allow the preservation of a wave front of any given form. This is the purpose proposed by the device according to the present invention. Indeed, the device according to the invention comprises a multimode optical cavity in which a stable oscillation of the coherent image is sustained.

SUMMARY OF THE INVENTION

The present invention concerns a memory-storage device for a coherent image in a multimode optical cavity, comprising at least one coherent source that generates at least a first signal wave and at least a second reference wave, optical guiding means allowing a closed loop to be formed in which circulates each signal wave, an amplifying interactive medium being disposed on the path of each signal wave and on that of each reference wave, each signal wave interfering with a reference wave in this medium in order to create a diffraction grating, each signal wave receiving the energy of this reference wave, characterized in that these guiding means form a multimode, optical cavity, this amplifying interactive medium being disposed in the Fourier plane of this cavity, a semi-transparent beam splitter being disposed on the path of each signal wave in order to extract a part of the energy of the multimode optical cavity.

BRIEF DESCRIPTION OF THE DRAWINGS

Other characteristics and advantages of the invention will appear in the following description, with reference to the annexed figures in which.

DETAILED DESCRIPTION OF THE PREFERRED EMBODIMENT

Prior to describing the device according to the invention that allows the memory-storage of a coherent image inside a multimode cavity using an amplifying medium, in which two waves interact—the object wave and a pumping wave—this two wave type interaction phenomenon will be firstly described with reference to FIGS. 1 to 3.

Figure 4:
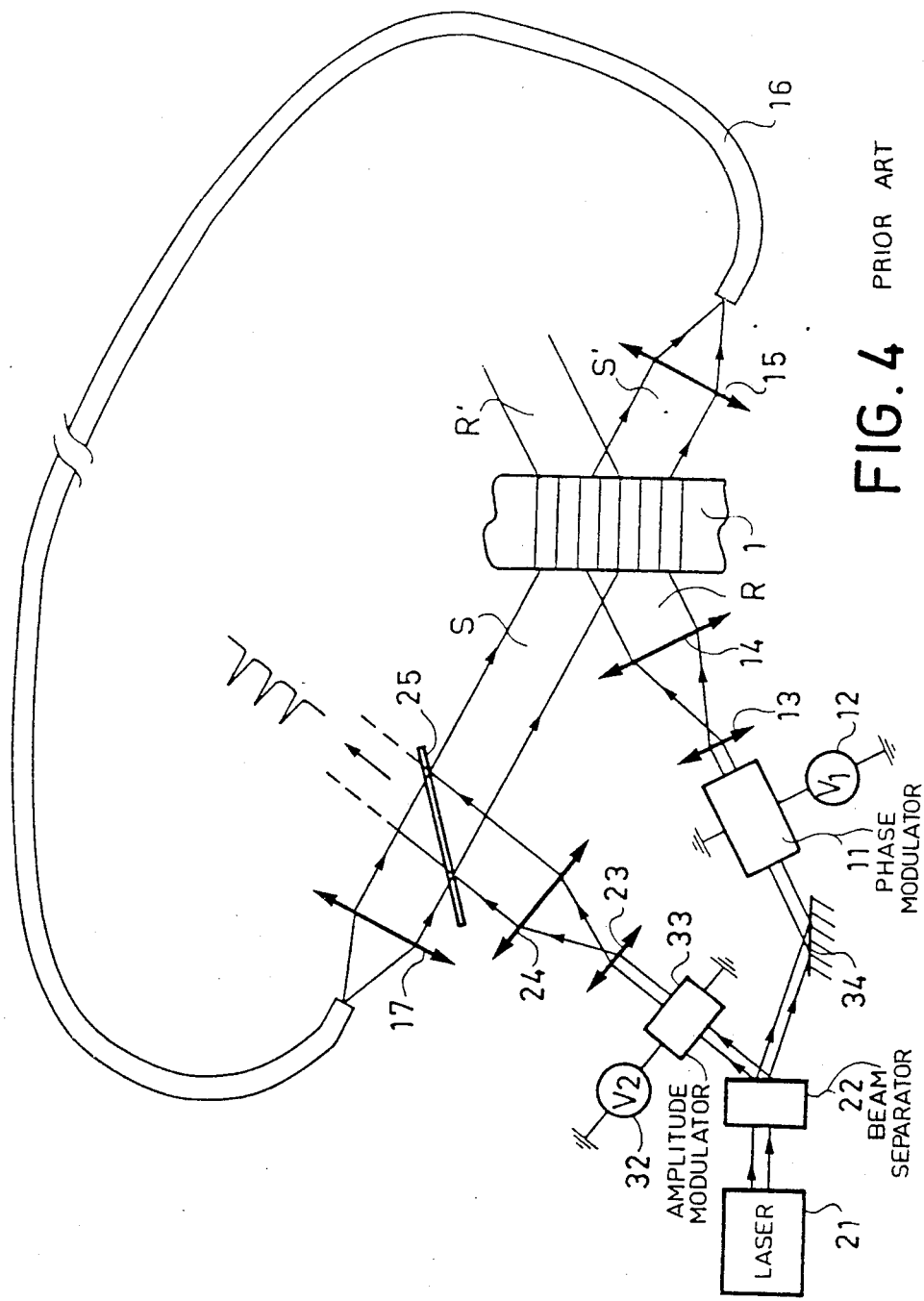
FIG. 4 is an explanatory figure of the operating of a device known in the prior art.

FIG. 4 illustrates a device known per se that uses an amplification of this type: this device allowing the amplification of an incident energy radiating wave by transferring the energy of a pumping beam towards the signal. It thus ensures the circulation of a radiating energy impulse in a fiber while maintaining the level of the signal, whatever the number of turns achieved.

Thus, the device according to the present invention applies the wave coupling phenomena to the reading of the phase gratings. The present invention concerns a high diffraction efficiency phase grating recorded in a permanent manner on a photosensitive support constituted by thick diffracting phase structures, photo-induced by index variation in electro-optical, photopolymer crystals or bleached silver materials.

Indeed, materials are currently available that allow the inscription of grating or high diffraction efficiency phase holograms that allow a memorization of data in a permanent manner. These materials are "thick" with respect to the average step of the photo-induced strata and their behaviour to the inscription and to reading is described by formalism of the coupled waves, following the BRAGG relation.

In the simple case of interference of two plane waves arriving on the photosensitive support with incidences of $+\theta$ and $-\theta$, the spacing of the planes of diffraction in the support is bound to the angle $\theta$ and to the wave length by the BRAGG relation $2\Lambda \sin \theta = \lambda$. Conversely, a given grating of step $\Lambda$ will diffract, in a significant manner, a reading beam of the wave length $\lambda$, if it arrives on the medium with the angle $\theta$, bound to $\lambda$ and $\Lambda$ by this BRAGG relation. A given grating, constituted by parallel diffraction planes spaced apart by $\Lambda$ can be reread by a beam of wave length $\lambda'$, it is sufficient that its incidence angle $\theta'$ be adjusted so that BRAGG's law $2\Lambda \sin \theta' = \lambda'$ is verified. If, as shown in FIG. 1, this grating is illuminated by two coherent plane waves R and S issued from a single laser and having the same intensity, the relation $\Lambda = \lambda/(2 \sin \theta)$ is obtained.

The step $\Lambda$ resulting from the interference of R and S is strictly identical to that of the phase grating, and it is, for example, these same beams R and S that have acted for the manufacture of the strata grating that was previously inscribed.

Therefore, in the thickness of the medium involved, object wave S interfered with reference wave R of the plane wave front. A grid of interference fringes thus created, generated in the crystal a strata index grating. This strata grating diffracts a part of the energy of the reference wave R in a diffracted wave S', the wave front of which is isomorphic from the front of the object wave.

Therefore, according to the formalism of the coupled waves, there is, after crossing through the crystal, a redistribution of energy between the two beams. This new distribution of energy is a function of the relative dephasing $\Psi$ between the two waves. Thus:

$I_R$, $I_S$: the intensity of the two waves that interfere;
$I_{R'}$, $I_{S'}$: the intensity of the two waves at the exit of the crystal.
$\Psi$: the dephasing of the luminous intensity with respect to the photo induced phase grid;
$\eta$: diffraction efficiency of the structure.

The intensities $I_S$ and $I_R$ are obtained respectively by the following relations:

$$I_{R'} = I_R(1 - \eta) + \eta I_S - 2\sqrt{I_R(1-\eta)I_S\eta} \sin\Psi$$

$$I_{S'} = I_R(1 - \eta) + \eta I_S + 2\sqrt{I_R(1-\eta)I_S\eta} \sin\Psi$$

In the particular case of figure $I_R = I_S = I_0$, or:

$$I_{R'} = I_0[1 - 2 \times \sqrt{\eta(1-\eta)} \sin\phi]$$

$$I_{S'} = I_0[1 + 2 \times \sqrt{\eta(1-\eta)} \sin\Psi]$$

The energy transfer is thus optimum when the following conditions are simultaneously satisfied.
$\eta = 50\%$
$\Psi = \pi/2$ In this case, after crossing through of the phase grid, the following wave intensive are obtained:
$I_{R'} = 0$
$I_{S'} = 2I_0$ The physical interpretation of the phenomen is as follows: Incident wave R is diffracted by the tri-dimensional phase grating. Wave S' thus generated is, for example, delayed in phase by $\pi/2$ with respect to the reading wave R. In a medium 1 in which the two waves interfere there is indeed a phase shift of $\pi/2$ between the interference grating 31 of the two beams of phase grating 30, as shown in FIG. 2.

On the contrary, wave R', that is generated by diffraction of wave S, would be advanced in phase by $\pi/2$ with respect to this same wave S.

Due to the introduction of a phase shift $\Psi = \pi/2$ between the two waves R and S that arrive on the medium 1, there is thus coherent phasing of the wave S' generated and the incident wave S. Indeed, for wave S', as represented in FIG. 3, the resulting phase shift with respect to wave S is: $-\pi/2 + \pi/2$; thus, this phase shift is nil. On the other hand, for wave R' the resulting phase shift with respect to wave R is $\pi/2 + \pi/2 = \pi$. Consequently, there is destructive interference in the direction of beam R and thus diminution of the directly transmitted energy according to R'.

Optimal conditions for the energy transfer are satisfied with the following experimental conditions:

$\eta = 50\%$;
$I_R = I_S = I_0$;
$\Psi = (\pi/2)$ and thus the gain $(I_{S'}/I_S)$ equals 3 dB.

These conditions are fulfilled with medium 1 realized, for example, in gelatin.

A device known per se in the prior art based on the wave coupling phenomena previously described is represented in FIG. 4.

Thus, in the case involving the luminous intensity grating of the interface of the two beams R and S shifted in phase by $\pi/2$ with respect to the phase grating, thereby giving rise to a diffracted wave of wave R on the phase grid superimposed on transmitted wave S; all this occurs as if the transmitted wave S was enriched by a fraction of the reference wave.

Beam S' issued from the grating is coupled to the propagation medium that can be, for example, a wave guide or a monomode fiber through the intermediary of standard optical components. In the case involved in FIG. 4, medium 1 is coupled to the fiber 16 through the intermediary of convergent lenses 15 and 17.

In this FIG. 4, two beams S and R are issued from a single laser 21 after having crossed through a beam separator 22.

Beam R crosses a phase modulator 11 then a beam enlarger composed of two lenses 13 and 14, after having been previously reflected by a mirror 34. Beam S consists of a radiating energy pulse that is initially entered due to an amplitude modulator 33 piloted by a generator 32. This impulse, after having crossed through a beam enlarger (23, 24), enters the loop through the intermediary of a separating blade (beam splitter) 25. This same separating blade (beam splitter) allows, furthermore, the impulsion that circulates in the loop formed on the fiber 16 coupled to medium 1 to exit. This beam splitter can, furthermore, be removed once the process is underway.

The signal issuing from this fiber 16 is reinjected at the input of the grating where it interferes in an unbroken manner with wave R issuing from laser 21. Dephasing $\Psi = \pi/2$ is adjusted precisely with the aid of electro-optical phase modulator 11 disposed on beam R, for example. This modulator being driven by a voltage $V_1$, adjustment is made of losses by optical absorption and coupling of signal S to 3 dB. Losses due to the external coupling of beam S through the intermediary of a beam splitter 25 are about 1 dB, and the losses due to the coupling between fiber 16 and medium 1 and the losses in this fibre 16 are about 2 dB.

In these conditions, the gain obtained by energy transfer of the pumping wave R towards signal wave S compensates the losses and the signal impulse level remains the same, whatever the number of passages in the propagation medium. The correct functioning of the system requires the stability in time of the condition of initial phase $\Psi = \pi/2$, from which arises the need for very good stability of the mode of the laser source. Requirements concerning the length of the coherence of the monomode source can be reduced if transit time T of the impulse in the fiber is a multiple of $(2l/c)$; l being the length of the laser cavity; indeed, $(2l/c)$ is the time interval between the two coherence maxima for a laser cavity. There is thus a good functioning coherence of the loop formed by turn 16 and medium 1 with respect to the functioning of the laser cavity.

The device known per se thus ensures the circulation of a single optical impulse in a fiber, or monomode guide, while maintaining the level of the signal constant, whatever the number of rotations achieved.

Figure 1:
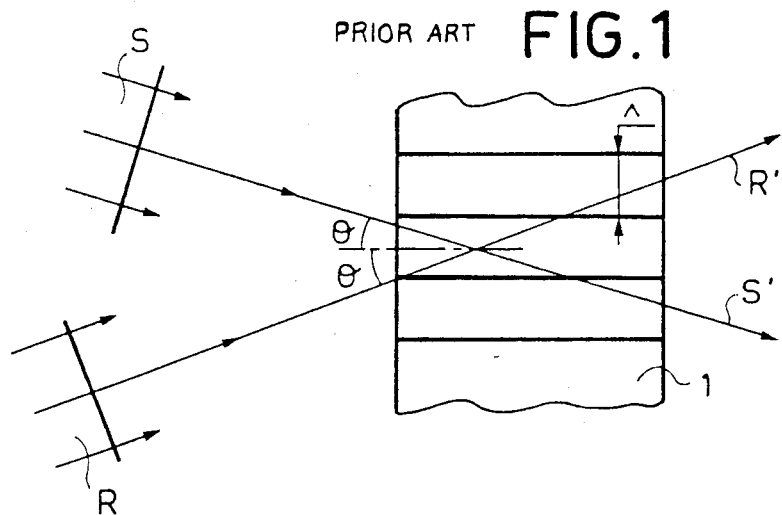
FIGS. 1 to 3 illustrate the operating of an amplifying medium known in the prior art.
Figure 2:
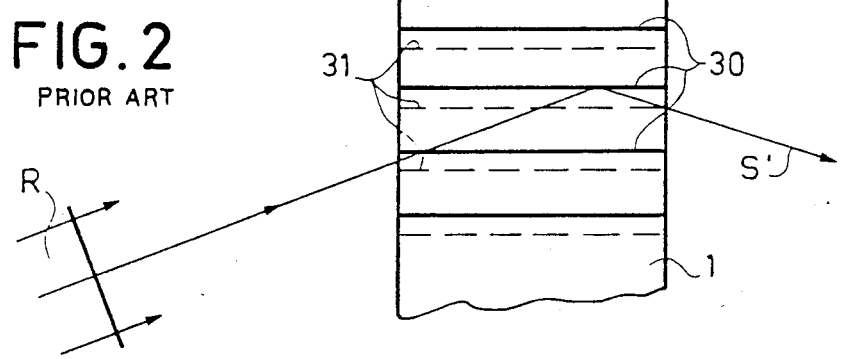
Figure 3:
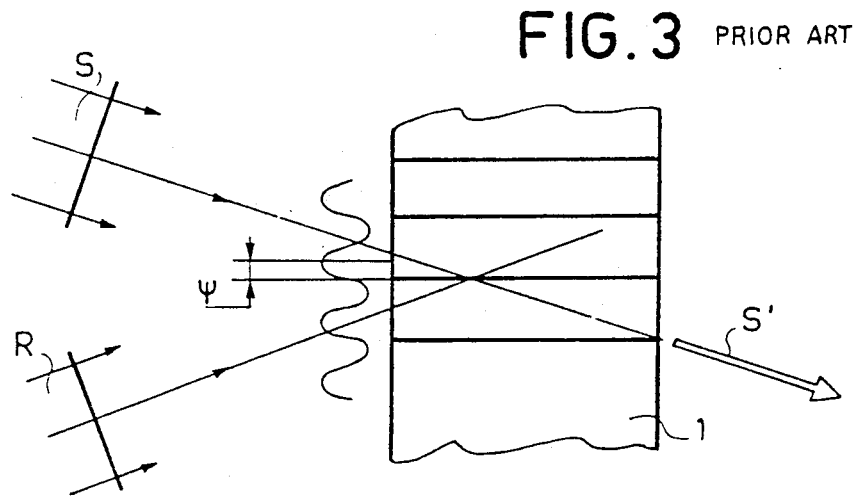

Contrary to this device of the prior art, in the device according to the invention that uses an amplifying medium of the type described in FIGS. 1 to 3, the object wave is no longer a simple impulse but it can have any wave front.

Figure 5:
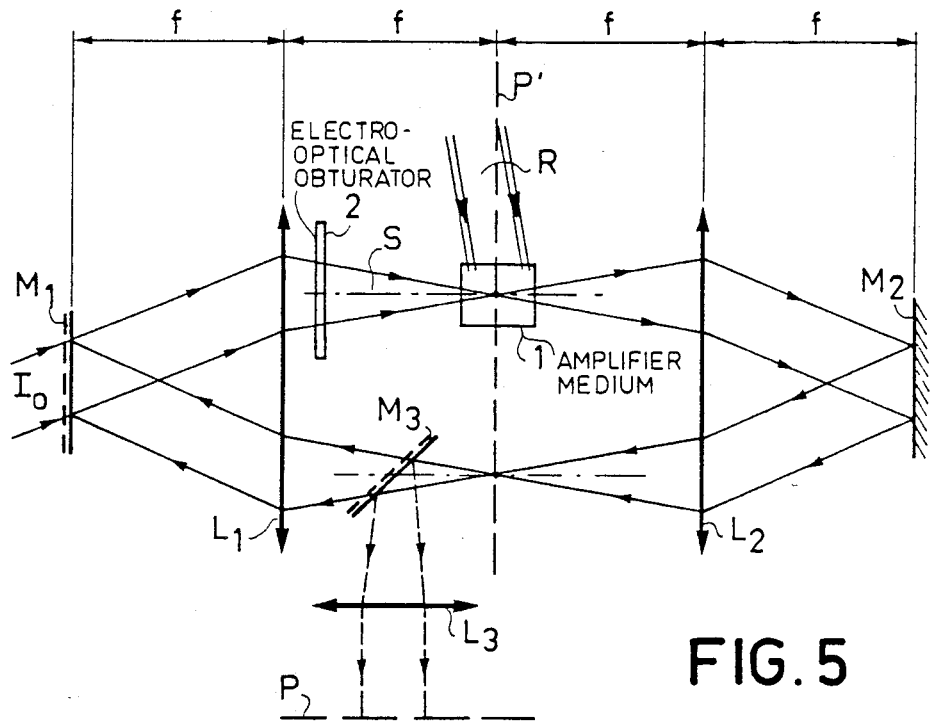
FIGS. 5 and 6 represent the device according to the invention.
Figure 6:
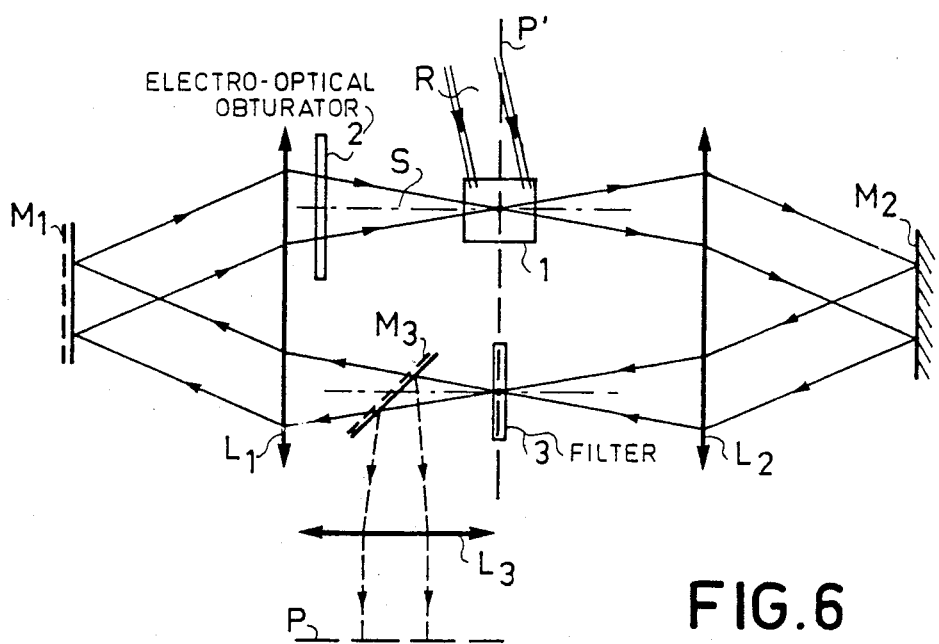

Thus, the invention illustrated with respect to FIGS. 5 and 6 concerns an amplification and oscillation device of a coherent optical image. The amplifying medium is constituted by a photo-refractive material operating by photo-induced index variation. The adjunction of a reverse feedback loop constituted by mirrors and lenses allows the realization of a multimode optical cavity and a sustained a stable oscillation of the image in the cavity.

In amplifying medium 1 is realized the coherent interference of an incident signal wave S with a reference wave R placed outside the axis of wave S and much more intense. In these conditions, within the entire volume of medium 1 is inscribed a diffracting phase structure, the establishment time constant of which depends on both the available power on the reference wave and the physical mechanisms present in this medium 1. Through an auto-diffraction mechanism of reference wave R in the phase grating that it inscribes, it is possible to obtain a strengthening of the amplitude of incident signal wave S, and thus an amplification after passing through medium 1. The origin of this wave coupling phenomenon is the non local response of the medium under the illumination action of the interference fringes. This spatial shift between the photo-induced index variation and the illumination can be induced:

either by displacing the strata at constant speed;
or by index change under the action of the illumination gradient (diffusion mechanism of the photo-carriers).

The first type of functioning can be envisaged with bismuth silicium oxide type material, bismuth germanium oxide type material, and the second type of functioning with potassium niobate or barium titanate type materials.

The transmitted intensity can be expressed as:

$$I_T = I_S \exp[\Gamma - \alpha] \times 1$$

$\Gamma$ = exponential coefficient;
$\alpha$ = absorption coefficient;
$1$ = interaction length The device according to the invention allows this optic parametric amplifier to be used where the beams are at the same frequency in order to achieve a multimode oscillator compatible with an image signal.

Furthermore, an electric oscillator is essentially constituted by an amplifier and a resonance circuit, the luminous oscillator comprises a amplifying medium of the light and an assembly of mirrors constituting what is called the "resonator" or, by analogy with the hyperfrequency oscillators, the "cavity" of the laser. An oscillation wave is propagated inside this cavity.

In the device according to the invention represented in FIG. 5, there is thus a laser cavity composed of the following elements: two mirrors $M_1$ and $M_2$ between which the object wave circulates, and an amplifying medium 1 situated on the path of this object wave. Two lenses $L_1$ and $L_2$ allow the definition of this object wave in the cavity. Mirror $M_1$ is partially reflecting, for example, semi-transparent, and allows the introduction of object wave in the cavity, as represented on FIG. 5; the input signal thus able to be suppressed, as illustrated by FIG. 6.

The diagram of the optical cavity, used and based on the Fourier transformation properties of the lenses, is indicated in FIG. 5. Indeed, plane P' is the focal plane common to the two lenses $L_1$ and $L_2$, it is the Fourier plane of the cavity. The input signal is constituted by a transparency or any other electro-optical transducer acting for the composition of the image in real time. This can also be any tridimensional object illuminated by a coherent light beam, the image of which is brought back to a plane.

The amplifier medium 1 is placed adjacent to the Fourier plane of lens $L_1$, thus allowing processing of the spectrum of the image. Lens $L_2$ and mirror $M_2$ allow the wave issued from the amplifier medium 1 to return towards the photoreactive medium after reflection on mirror $M_1$, semitransparent, for example, the coefficients of reflection R and transmission T of which are thus such that: R = T = 50%. Mirror $M_1$ ensures both the introduction of the signal of the incident image and the reflection of the amplified wave turning in the cavity. Another semi-transparent beamsplitter $M_3$ allows to the extraction of a fraction of the energy contained in the cavity, lens $L_3$ allows the projection of the image in plane P.

The oscillation condition of this cavity is ensured if the gain of the amplifying medium is superior to the losses of the cavity due especially to mirrors $M_1$, $M_2$ and to the reflections on the optical components.

The number N of dots of the image liable to be processed in parallel in this multimode cavity is a direct function of the dimension of the amplifier crystal that brings about a limitation of the spectrum of the spatial frequences.

If the diameter e of a diffraction spot is considered:

$$e = \frac{\lambda F}{D} \text{ and its surface } s = \frac{\lambda^2 F^2}{D^2}$$

If a square crystal of side d is considered:

$$N = \frac{d^2}{\frac{\lambda^2 F^2}{D^2}}$$

thus:

$$N = \frac{D^2 \times d^2}{\lambda^2 \times F^2}$$

D = dimension of the incident image;
d = dimension of the amplifier crystal;
F = focal distance of lens $L_1$;

with the following digital values taken by way of non-limitative example:
D = 30 mm;
d = 3 mm;
F = 300 mm;
$\lambda = 0.5 \times 10^{-4}$ cm
thus
$N = 4 \times 10^5$ points.

Figure 7:
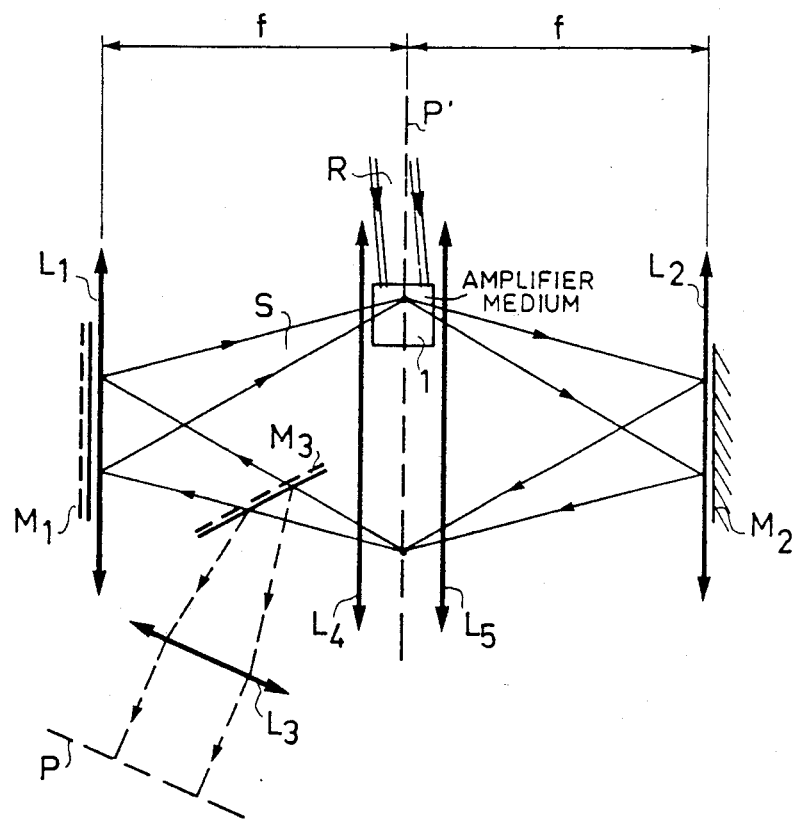
FIG. 7 represents a variant of the device according to the invention.

This value of the optical disposition of FIG. 5 is given by way of example of FIG. 7. This structure, which is more compact than the previous one, also ensures the operation of a multimode optical cavity.

Indeed, in FIGS. 5 and 6 the distance separating the mirrors is four times the focal distance f of superimposed identical lenses $L_1$ and $L_2$. In this FIG. 7, the introduction of lenses $L_4$ and $L_5$, allows the consideration of one cavity in which the distance between the two mirrors is about twice this focal distance, these mirrors being presumed stuck to lenses $L_1$ and $L_2$.

A stable oscillation can be maintained in the absence of the initial incident image signal if the two following conditions are fulfilled.

The amplification brought by the medium is superior to the losses of the cavity:

$$\Gamma > \alpha$$

Optical path $l_{opt}$ seen by all the modes of the cavity is the same and is with a multiple of the wave length: in the same manner the dephasing induced by the journey in the cavity is worth $2K\pi$.

$$\Delta\phi = \frac{2\pi}{\lambda} \times l_{opt} = 2k\pi$$

The device according to the invention meets the Fabry-Perrot formalism, the waves are added that have achieved the paths of length $l_{opt}$, $2l_{opt}$, $3l_{opt}$... and that satisfies the phase condition set out hereinabove.

If it is supposed that the gain of the amplifier medium is independent from the ratio of the pump and signal beams, the amplitude of the field transmitted corresponding to a propagation mode is put into the following form:

$$E_t = E_0 t_1 r_3 \exp\Gamma \frac{1}{2} \left[ 1 + t_3 r_1 e^{\frac{\Gamma l}{2}} + t_3^2 r_1^2 e^{\frac{2\Gamma l}{2}} + t_3^u r_1^u e^{\frac{n\Gamma l}{2}} + \ldots \right]$$

This Fabry Perrot commation is written:

$$E_t = E_o \left| \frac{t_1 r_3 \exp\Gamma\frac{l}{2}}{1 - t_3 r_1 \exp\Gamma\frac{l}{2}} \right|$$

Or in intensity:

$$I_T = I_0 \times T_1 \times R_3 \frac{\exp\Gamma l}{|1 - \sqrt{T_3 R_1} \exp\Gamma\frac{l}{2}|^2}$$

The oscillation condition that is obtained for $I_T \to \infty$, is written:

$$\exp\left(\frac{\Gamma \times l}{2}\right) \geq \frac{1}{\sqrt{T_3 R_1}}$$

In order to delete the data stored in the cavity, an electrooptical cap 2, a shutter for example, allows the signal beam oscillating in the cavity to be cut. The photoreactive crystal is thus uniformly illuminated by the reference wave (or pump wave) which relaxes the photoinduced index variation.

In order to use the cavity for the treatment of images, an amplitude and phase filter 3 can be placed in the Fourier plane common to lenses $L_1$-$L_2$ in order to modify the contents in spatial frequencies of the image.

The introduction into the cavity of a phase function $\phi(x, y)$ induces an intensity modulation of the form:

$$I_R = I_0 \times T_1 \times R_3 \frac{\exp\Gamma l}{1 - \sqrt{T_3 R_1} \exp\Gamma\frac{l}{2}\sin^2\phi(x,y)}$$

Such a transfer function permits non linear operations on the images.

Different materials can be used as amplification medium 1 in the cavity. Photoreactive materials constitute an interesting solution for the coherent amplification of the images by energy transfer from a pump wave. The crystals used are: potassium niobate ($KNbO_3$), barium titanate ($BaTiO_3$) bismuth-silicium oxide ($Bi_{12}SiO_{20}$), bismuth-germanium oxide ($B_{12}GeO_{20}$). For each of these crystals the coherent amplification of an image was obtained with gains of about 5 to 500. Exceptionally high values ($\simeq 500$) of the gain are obtained with barium titanate crystals ($BaTiO_3$) for a particular electro-optical orientation of this material. The incidence of the incident wave on the crystal corresponds to the highest electro-optical coefficient; this incidence is about 45°, for example.

For the other crystals cited, this incidence is 90°. The inscription energies required in the visible field are typically about 100 $\mu Jcm^{-2}$ for barium titanate, thus compatible with the power levels available from an Argon laser.

In the device according to the invention, the wave that is propagated in the cavity must reply to phase conditions at the input of the cavity; the grating inscribed in the amplifier medium is thus stabilized, and at each passage the inscribed grating is thus superimposed on the previously inscribed grating.

But the interference system inscribed in this medium can, in function of the dynamic of the material involved, comprise n different grids, but the maximum index variation is thus divided by n, and there is less gain for each grating. For the barium titanate, this allows a considerable gain, n can be equal to 10. Thus, for example, the instantaneous illumination of the crystal by three signal wave at three different waves lengths $\lambda_1$, $\lambda_2$, $\lambda_3$, can be considered which thus brings about, if three reference waves of the same wave length $\lambda_1$, $\lambda_2$, and $\lambda_3$ are considered, the inscription of three grids at the same time. The device according to the invention thus allows the memory storage of a coherent three color image.

The mirrors used in FIGS. 5 and 6 are plane mirrors that have their reflecting surface parallel to each other, but this is not necessary; they can have reflecting surfaces forming a certain angle between them, or they can be spherical mirrors. It is necessary that the incidence of the object wave entering in the cavity be such that after passing through lens $L_1$ it reaches the amplifier medium 1. Furthermore, it is necessary that these optical guiding means, lenses and mirrors, allow the optical path to be closed on itself in order to form therefore a closed loop.

Thus, the device according to the invention allows the memory-storage and processing of a coherent optical image.

We claim:

1. A memory-storage device for storing a coherent image in a multimode optical cavity, comprising:

at least one coherent light source that generates at least a first signal wave and at least a second reference wave, each wave having an optical path;

optical guiding means for forming a closed loop in which circulates each said signal wave, said guiding means forming a multimode optical cavity having a Fourier plane;

an amplifying interactive medium disposed in the path of each said signal wave and in the path of each said reference wave, each said signal wave interfering with a reference wave in said medium in order to create a diffraction grating therein, each signal wave receiving energy from the interfering reference wave, said amplifying interactive medium being disposed in said Fourier plane in said cavity; and a semi-transparent beam splitter disposed in the path of each said signal wave in order to extract a part of the energy from the multimode optical cavity.

2. A device according to claim 1, wherein said guiding means include:

two plane mirrors, the reflecting surfaces of which are disposed facing each other, one of these mirrors being a semi-transparent mirror, each signal wave entering into said cavity via this semi-transparent mirror; and at least a first and a second lens disposed between said two mirrors in such a way that there is a common focal plane that coincides with said Fourier plane of said cavity, the incidence of each signal wave at an input of said device being such that after passage through the first lens the signal wave reaches the amplifying interactive medium, the optical path of the signal wave in the cavity closing upon itself.

3. A device according to claim 2, further including an amplitude and phase filter placed in the focal plane common to said first and second lenses and in the path of each signal wave.

4. A device according to claim 1, wherein several signal waves of different wavelengths are introduced into said device and circulate in said optical cavity and interfere in said medium with reference waves of the same wavelength that are coherent.

5. A device according to claim 4, wherein three signal waves having three different wavelengths are introduced and circulate in the optical cavity and interfere in the medium with reference waves of the same wavelength that are coherent therewith.

6. A device according to claim 1, wherein said amplifying interactive medium, is made of a photoreactive material.

7. A device according to claim 6, wherein said photoreactive material is chosen from among the following materials: potassium niobate, barium, titanate, bismuth-silicium oxide, bismuth-germanium oxide.

8. A device according to claim 1, further including an electro-optical cap disposed in the path of each signal wave in order to stop the circulation of the signal wave in the cavity.

* * * * *